US012396084B2

(12) United States Patent
Qi et al.

(10) Patent No.: US 12,396,084 B2
(45) Date of Patent: Aug. 19, 2025

(54) DIELECTRIC BARRIER DISCHARGE PLASMA GENERATOR

(71) Applicant: ASMPT Singapore Pte. Ltd., Singapore (SG)

(72) Inventors: Jun Qi, Hong Kong (CN); Hao Meng, Chengdu (CN); Zheng Chen, Chengdu (CN); Yi Dong Du, Chengdu (CN); Li Dong He, Chengdu (CN)

(73) Assignee: ASMPT SINGAPORE PTE. LTD., Singapore (SG)

( * ) Notice: Subject to any disclaimer, the term of this patent is extended or adjusted under 35 U.S.C. 154(b) by 182 days.

(21) Appl. No.: 18/204,586

(22) Filed: Jun. 1, 2023

(65) Prior Publication Data

US 2023/0403781 A1 Dec. 14, 2023

(30) Foreign Application Priority Data

Jun. 8, 2022 (CN) ......................... 202210642604.0

(51) Int. Cl.
*H05H 1/24* (2006.01)

(52) U.S. Cl.
CPC ....... *H05H 1/2406* (2013.01); *H05H 2242/10* (2013.01)

(58) Field of Classification Search
None
See application file for complete search history.

(56) References Cited

U.S. PATENT DOCUMENTS

| | | | | |
|---|---|---|---|---|
| 5,757,132 | A | 5/1998 | Matsuno et al. | 313/607 |
| 9,144,858 | B2 * | 9/2015 | Lee | B23K 10/00 |
| 2010/0183827 | A1 * | 7/2010 | Hirayama | B05C 13/00 427/575 |
| 2017/0137939 | A1 | 5/2017 | Creyghton et al. | |

FOREIGN PATENT DOCUMENTS

| | | | |
|---|---|---|---|
| TW | 345676 | B | 11/1998 |
| TW | 200952562 | A | 12/2009 |
| TW | 201607380 | A | 2/2016 |

OTHER PUBLICATIONS

Office Action dated Jul. 29, 2024 issued in corresponding Taiwanese Patent Application No. 112117797 and its English translation.

* cited by examiner

*Primary Examiner* — Kenneth B Wells
(74) *Attorney, Agent, or Firm* — OSTROLENK FABER LLP

(57) ABSTRACT

A dielectric barrier discharge plasma generator includes a ground electrode and a high voltage electrode which are configured to form a circuit to receive a power input for plasma generation, a dielectric barrier having a first surface attached to the high voltage electrode, and a second surface facing the ground electrode, and discharge gap being formed between the second surface of the dielectric barrier and the ground electrode for plasma generation, and a resiliently deformable mechanism operative to bias the high voltage electrode against the first surface of the dielectric barrier.

14 Claims, 7 Drawing Sheets

DIELECTRIC BARRIER DISCHARGE PLASMA GENERATOR

FIELD OF THE INVENTION

The invention generally relates to plasma generation, and more specifically to a dielectric barrier discharge (DBD) plasma generator.

BACKGROUND

Atmospheric pressure plasma has been used for many applications in the electronics and semiconductor industries. Atmospheric pressure plasma may be generated with various electrical discharge technologies, including corona discharge, glow discharge, gliding arc, and dielectric barrier discharge (DBD), etc. Among these techniques, the DBD is adopted in more applications due to its high efficiency, high cost-effectiveness, and simple geometrical configurations.

However, in conventional DBD plasma generators, ineffective discharge may be caused due to air gaps between high voltage electrodes of the DBD plasma generators and dielectric barriers attached thereto. Specifically, ineffective discharge between high voltage electrodes and dielectric barriers will reduce the generation of plasma in discharge gaps and cause overheating of the high voltage electrodes and dielectric barriers.

It would therefore be beneficial to provide a solution for reducing ineffective discharge caused by the air gaps between electrodes and dielectric barriers attached to the electrodes of the DBD plasma generators so as to improve the discharge efficiency of DBD plasma generators

SUMMARY OF THE INVENTION

It is thus an object of the invention to seek to provide an improved DBD plasma generator that includes a resilient mechanism designed for reducing the air gap between a high voltage electrode and a dielectric barrier of the DBD plasma generator. With this improved DBD plasma generator, the ineffective discharge caused by the air gap present between the high voltage electrode and the dielectric barrier can be significantly reduced, thereby greatly improving the discharge efficiency of the DBD plasma generator.

According to various embodiments of the present invention, there is provided a dielectric barrier discharge plasma generator. The plasma generator comprises a ground electrode and a high voltage electrode, which are configured to form a circuit to receive a power input for plasma generation, a dielectric barrier having a first surface in contact with the high voltage electrode and a second surface facing the ground electrode, a discharge gap being formed between the second surface of the dielectric barrier and the ground electrode for generating plasma, and a resiliently deformable mechanism operative to bias the high voltage electrode against the first surface of the dielectric barrier.

In some embodiments, the high voltage electrode may include a first conductive part and a second conductive part which are physically separated from each other, wherein the resiliently deformable mechanism includes a resilient member disposed between the first conductive part and the second conductive part, the resilient member being operative to apply a biasing force to the first and the second conductive parts to bias the first and second conductive parts against the first surface of the dielectric barrier. Specifically, the first and second conductive parts are biased to fully contact different parts of the first surface of the dielectric barrier.

In some embodiments, the resilient member may include a compression spring disposed between the two conductive parts. The two conductive parts may include two separate semi-cylindrical structures or two cuboid-shaped structures.

In some embodiments, the resilient member may include at least one deformable sheet metal plate. For example, the resilient member may include two curved deformable sheet metal plates, each having a first edge and a second edge on opposing sides of the sheet metal plate, the first and second edges of each sheet metal plate being respectively coupled to two opposite ends of the first and second conductive parts. The first and second conductive parts may include two separate planar or curved metal plates.

In some embodiments, the resiliently deformable mechanism may include a slot formed on the high voltage electrode such that the high voltage electrode is deformable to provide a biasing force to bias an external surface of the high voltage electrode against the first surface of the dielectric barrier. In one embodiment, the slot is formed and oriented along a direction parallel to a longitudinal axis of the high voltage electrode. The high voltage electrode may be made of a metal plate and have a cylindrical or cuboid shape. In other words, the high voltage electrode may include a cylindrically shaped or cuboid-shaped metal plate.

In some embodiments, the dielectric barrier includes a tubular structure that encloses the high voltage electrode in order to avoid the high voltage electrode from being in contact with reactive gas entering into the discharge gap.

In the present invention, the plasma generator may be a cylindrical-type or planar-type plasma generator. If the plasma generator is a cylindrical-type plasma generator, the dielectric barrier includes a cylindrical structure, the first surface of the dielectric barrier includes an inner cylindrical surface of the dielectric barrier and the second surface of the dielectric barrier includes an outer cylindrical surface of the dielectric barrier. If the plasma generator is a planar-type plasma generator, the dielectric barrier has a rectangular cross-section, and the first surface of the dielectric barrier includes two opposing side inner faces of the dielectric barrier.

In order to avoid overheating of the high voltage electrode and dielectric barrier, the plasma generator may further comprise a cooling air inlet formed on a top cover of the plasma generator to allow cooling air to enter the space for enclosing the high voltage electrode and an air outlet formed on the top cover. The top cover may be made from a non-conductive material, e.g., plastic.

The plasma generator further includes a plasma outlet formed at one end of the ground electrode for discharging or releasing the plasma generated in the discharge gap, and at least one reactive gas inlet formed on the ground electrode to allow reactive gas to enter the discharge gap. The plasma outlet may include at least one opening located at a bottom end of the ground electrode. The number and cross-section shape of the opening(s) may be adjusted according to the requirements of actual applications.

With the dielectric barrier discharge plasma generator provided in embodiments of the invention, the air gap between the high voltage electrode and the dielectric barrier can be significantly reduced or avoided. Thus, the ineffective discharge caused by this air gap can be effectively reduced or avoided, and the discharge efficiency of the dielectric barrier discharge plasma generator is greatly improved.

These and other features, aspects, and advantages will become better understood with regard to the description section, appended claims, and accompanying drawings.

BRIEF DESCRIPTION OF THE DRAWINGS

Embodiments of the present invention will now be described, by way of example only, with reference to the accompanying drawings, in which.

In the drawings, like parts are denoted by like reference numerals.

DETAILED DESCRIPTION OF THE PREFERRED EMBODIMENTS OF THE INVENTION

Figure 1:
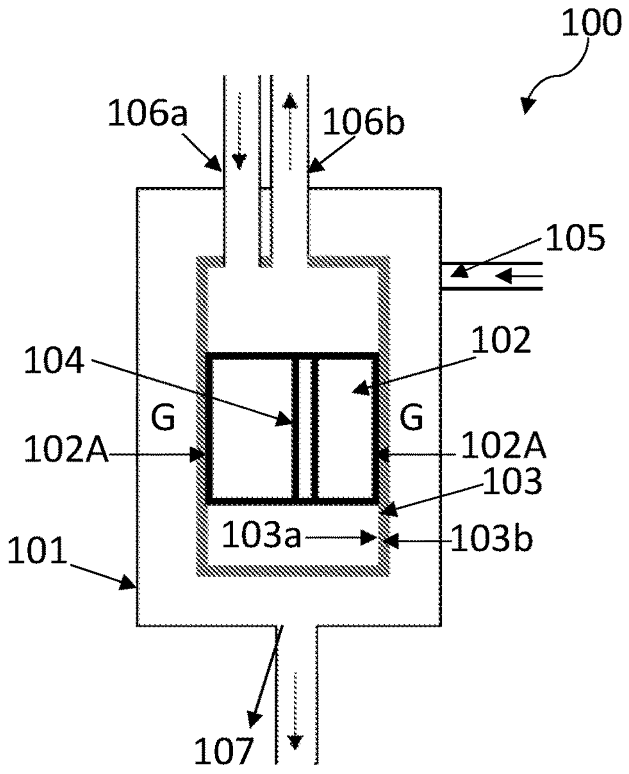
FIG. 1 is a schematic cross-sectional view of a dielectric barrier discharge plasma generator according to some embodiments of the invention.

FIG. 1 is a schematic cross-sectional view of a dielectric barrier discharge plasma generator 100 according to some embodiments of the invention. As shown in FIG. 1, the dielectric barrier discharge plasma generator 100 includes a ground electrode 101, a high voltage electrode 102, a dielectric barrier 103, and a resiliently deformable mechanism 104. The ground electrode 101 and the high voltage electrode 102 are configured to form an electrical circuit to receive a power input for plasma generation.

Referring to FIG. 1, the ground electrode 101 forms a casing of the plasma generator 100. The dielectric barrier 103 is fixedly located within the casing formed by the ground electrode 101 and configured to form a space to enclose the high voltage electrode 102. The dielectric barrier 103 has a first surface 103*a* attached to the high voltage electrode 102 for covering a contact surface 102A of the high voltage electrode 102, and a second surface 103*b* facing an internal surface of the ground electrode 101, and a discharge gap G for plasma generation is formed between the second surface 103*b* of the dielectric barrier 103 and the internal surface of the ground electrode 101. The resiliently deformable mechanism 104 is operative to bias the contact surface 102A of the high voltage electrode 102 against the first surface 103*a* of the dielectric barrier 103, thereby reducing or even eliminating any air gap between the contact surface 102A of the high voltage electrode 102 and the first surface 103*a* of the dielectric barrier 103.

The plasma generator 100 also includes at least one reactive gas inlet 105 which is configured to allow the reactive gas for plasma generation to enter the discharge gap G. Although in FIG. 1, only one gas inlet 105 is located in the side wall of the ground electrode 101, it should be appreciated by a person skilled in the art that the number and position of the reactive gas inlets in other embodiments of the invention may be adjusted according to the actual design and requirements of the plasma generator as long as the reactive gas can be guided to enter the discharge gap by the reactive gas inlet(s). For example, there may be two reactive gas inlets, with both or only one gas inlet being located on the top wall or side wall of the ground electrode 101.

Referring to FIG. 1, the plasma generator 100 may further include a cooling air inlet 106*a* and an air outlet 106*b* which are configured to establish a cooling air circulation for efficiently lowering the temperature of the high voltage electrode 102 and the dielectric barrier 103 in order to avoid overheating thereof. The cooling air inlet 106*a*, and air outlet 106*b* are located on a top cover of the plasma generator 100, the former being arranged to allow the cooling air to enter a space enclosed by the dielectric barrier 103 in which the high voltage electrode 102 is located and the latter being arranged to discharge air from the space.

The plasma generator 100 also includes a plasma outlet 107 as shown in FIG. 1. The plasma outlet 107 may be provided at a bottom end of the ground electrode 101 for allowing the plasma generated in the discharge gap to be discharged or released and applied to an electronic component sample, e.g., a wafer, located below the plasma generator 100. It should be noted that the shape and position of the plasma outlet 107 may be adjusted to meet the requirements of various applications.

In use, the ground electrode 101 is configured to establish a direct connection to the ground, and both the ground electrode 101 and the high voltage electrode 102 are removably connected to a high-voltage alternating current (AC) generator (not shown in FIG. 1) which is configured to provide a high-voltage and high-frequency output to the plasma generator 100, such that electrical breakdown of a reactive gas entering the discharge gap through the reactive gas inlet 105 occurs in the plasma generator 100 for plasma generation. The high voltage electrode 102 is enclosed in a space formed by the dielectric barrier 103 so as to prevent the high voltage electrode 102 from being in contact with the reactive gas in the plasma generator 100. Also, even if there is any undesired discharge due to an air gap between the high voltage electrode 102 and the dielectric barrier 103, it will not affect plasma treatment of an electronic component placed below the plasma outlet 107 since the undesired discharge occurs in a space enclosed by the dielectric barrier 103, i.e., an enclosed space formed by the dielectric barrier 103.

In various embodiments of the invention, the plasma generator may be a cylindrical-type or a planar-type dielectric barrier discharge plasma generator. Detailed structures of some plasma generators according to certain embodiments of the invention will be described below. The common features of these plasma generators which have been described above with reference to the plasma generator 100 that is shown in FIG. 1 will not be repeated below.

Figure 2A:
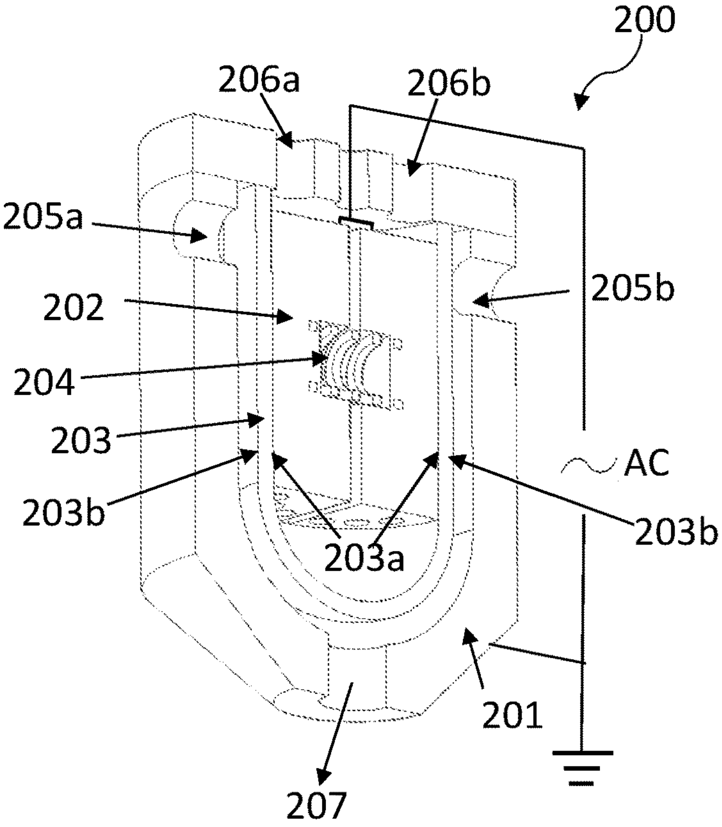
FIG. 2A and FIG. 2B respectively show a perspective cut-away view and a cross-sectional view of a cylindrical-type dielectric barrier discharge plasma generator according to a first embodiment of the invention.
Figure 2B:
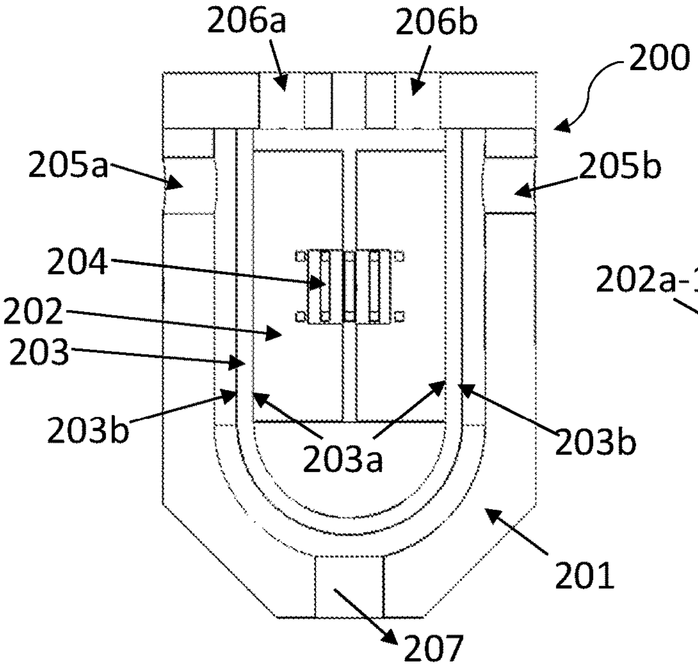

FIG. 2A and FIG. 2B respectively show a perspective cut-away view and a cross-sectional view of a cylindrical-type dielectric barrier discharge plasma generator 200 according to a first embodiment of the invention. Referring to FIG. 2A and FIG. 2B, the plasma generator 200 includes a ground electrode 201 in the form of a cylindrical casing with a frusto-conical bottom, a dielectric barrier 203 fixedly located within the cylindrical casing (the dielectric barrier 203 being in the form of a tubular structure with a circular cross-sectional shape), a high voltage electrode 202 having two separate conductive parts and being enclosed in the space formed by the dielectric barrier 203, and a resiliently deformable mechanism 204 in the form of a compression spring which is disposed between the two separate conductive parts of the high voltage electrode 202.

Figure 2C:
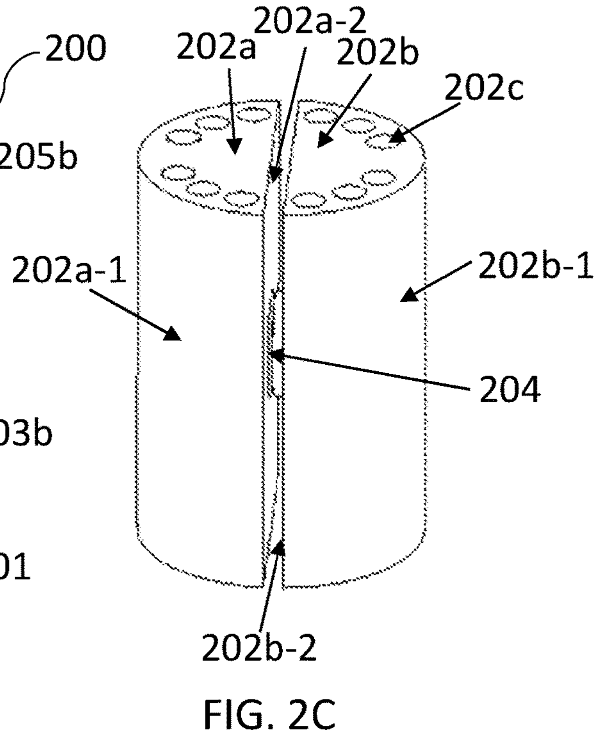
FIG. 2C shows a perspective view of a high voltage electrode and a resiliently deformable mechanism of the plasma generator according to the first embodiment.

FIG. 2C shows a perspective view of the high voltage electrode 202 and the resiliently deformable mechanism 204 in the form of a compression spring of the plasma generator 200 according to the first embodiment. As shown in FIG. 2C, the high voltage electrode 202 includes a first semi-cylindrical conductive part 202*a* with a first or external surface 202*a*-1 and a second or internal surface 202*a*-2, and a second semi-cylindrical conductive part 202*b* with a first or external surface 202*b*-1 and a second surface 202*b*-2. The first and second conductive parts are physically separated from each other and the compression spring 204 is located between the first and second conductive parts 202*a*, 202*b*. Specifically, two ends of the compressing spring 204 are respectively coupled to the two opposing second surfaces 202*a*-2, 202*b*-2 such that when the high voltage electrode 202 and the compression spring 204 are installed in the plasma generator 200, the compression spring 204 is compressed, which in turn applies a biasing force to the first and second conductive parts 202*a*, 202*b* so as to bias the first conductive part 202*a* and the second conductive part 202*b* against the internal surface 203*a* of the dielectric barrier 203. Specifically, when the high voltage electrode 202 and the compression spring 204 are installed in the plasma generator 200, the first surface 202*a*-1 of the first conductive part 202*a* is biased to fully contact a first part of the internal surface 203*a* of the dielectric barrier 203, and the first surface 202*b*-1 of the second conductive part 202*b* is biased to fully contact a second part of the internal surface 203*a* of the dielectric barrier 203. The first part of the internal surface 203*a* is separate from the second part of the internal surface 203*a*. A discharge gap G around the cylindrical dielectric barrier 203 is formed between the external surface 203*b* of the dielectric barrier 203 and the ground electrode 201. It should be noted that the discharge gap G is only formed between portions of the dielectric barrier 203 which contact the first surfaces 202*a*-1, 202*b*-1 of the high voltage electrode 202 and the opposing portions of the ground electrode 201.

Referring to FIG. 2A and FIG. 2B, in the first embodiment, the plasma generator 200 also includes a first reactive gas inlet 205*a* and a second reactive gas inlet 205*b* which are located in the side wall of the ground electrode 201 to allow reactive gas to enter the discharge gap between the ground electrode 201 and the dielectric barrier 203. The first reactive gas inlet 205*a* is arranged in the side wall of the ground electrode 201 opposite the first conductive part 202*a* of the high voltage electrode 202, and the second reactive gas inlet 205*b* is arranged in the side wall of the ground electrode 201 opposite the second conductive part 202*b* of the high voltage electrode 202. It is to be appreciated by a person skilled in the art that the first and second reactive gas inlets 205*a*, 205*b* may be located on the top wall of the ground electrode 201 in other embodiments, and the plasma generator 200 may include fewer or more than two reactive gas inlets.

As shown in FIG. 2A and FIG. 2B, the plasma generator 200 further includes a cooling air inlet 206*a* and an air outlet 206*b* formed on a top cover of the plasma generator 200. Referring to FIG. 2C, each of the first and second conductive parts 202*a*, 202*b* may include a plurality of through-holes 202*c* passing through the conductive parts 202*a*, 202*b* along a direction parallel to a longitudinal axis of the high voltage electrode 202. The through-holes 202*c* are provided to allow cooling air to enter them so as to accelerate the cooling of the high voltage electrode 202. It should be noted that in some embodiments of the invention, the cooling air inlet 206*a* and/or the air outlet 206*b* may be further extended such that one end thereof contacts a top surface of the high voltage electrode 202 or enters into a through-hole of the high voltage electrode 202, so as to reduce the temperature of the high voltage electrode 202 faster.

Figure 2D:
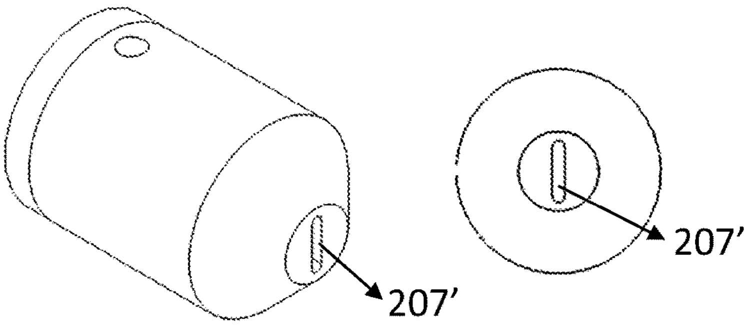
FIG. 2D shows a first alternative design of a plasma outlet according to the first embodiment of the invention.
Figure 2E:
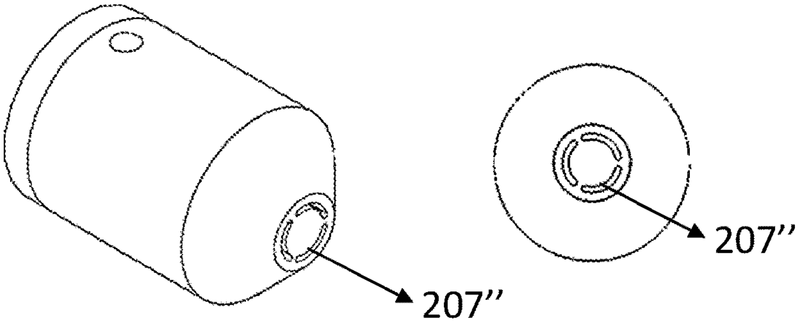
FIG. 2E shows a second alternative design of the plasma outlet according to the first embodiment of the invention.
Figure 2F:
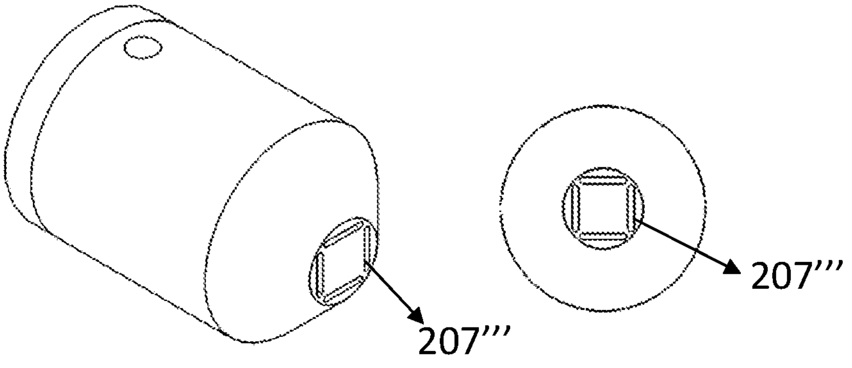
FIG. 2F shows a third alternative design of the plasma outlet according to the first embodiment of the invention.

As shown in FIG. 2A and FIG. 2B, the plasma generator 200 further includes a plasma outlet 207 having a circular cross-section which is an opening located at the bottom end of the ground electrode 201. Alternatively, the plasma outlet 207 may be designed according to actual needs in different applications. For example, the plasma outlet 207 may include at least one slit opening provided on the bottom surface of the plasma generator 200. FIG. 2D shows a first alternative design of the plasma outlet 207' according to the first embodiment of the invention. In this design, the plasma outlet 207' includes a slit opening located at the center of the circular bottom surface of the plasma generator 200. FIG. 2E shows a second alternative design of the plasma outlet 207" which includes three curved slit openings evenly spaced along a circumference of a circle on the bottom surface of the plasma generator 200. FIG. 2F shows a third alternative design of the plasma outlet 207'" which includes four separate straight slit openings respectively arranged along four edges of a rectangular or square. The plasma outlets with different shapes may be used in different applications to ensure that the plasma is applied specifically to required portions of electronic components located below the plasma generator 200.

Figure 3A:
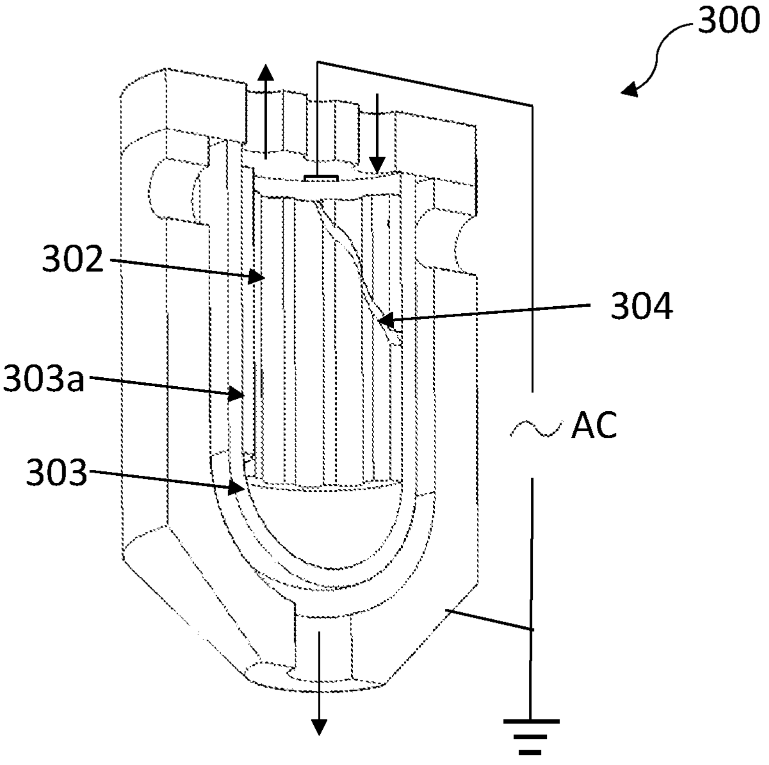
FIG. 3A shows a perspective cut-away view of a cylindrical-type dielectric barrier discharge plasma generator according to a second embodiment of the invention.

FIG. 3A shows a perspective cut-away view of a cylindrical-type dielectric barrier discharge plasma generator 300 according to a second embodiment of the invention. Compared to the plasma generator 200 in the first embodiment, the plasma generator 300 includes a different high voltage electrode 302 and a different resiliently deformable mechanism 304. Other components of the plasma generator 300 which are the same as the plasma generator 200, will not be repeated here.

Figure 3B:
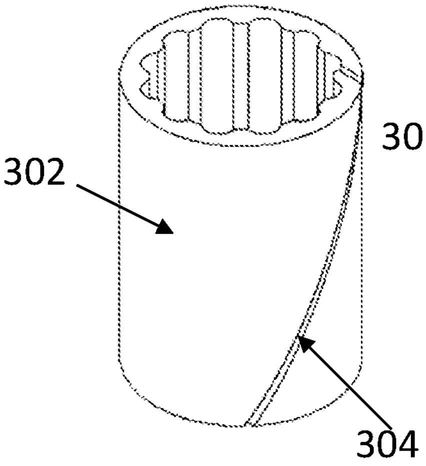
FIG. 3B shows a perspective view of a high voltage electrode and a resiliently deformable mechanism of the plasma generator according to the second embodiment.
Figure 3C:
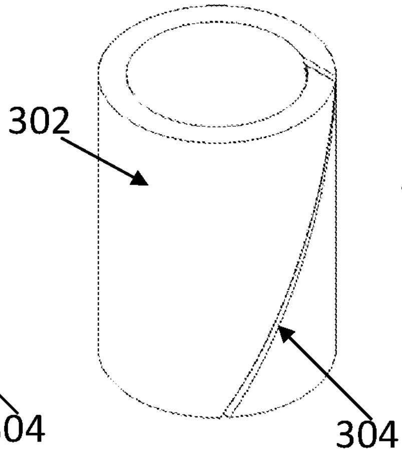
FIG. 3C shows a perspective view of a first alternative high voltage electrode and resiliently deformable mechanism of the plasma generator according to the second embodiment.
Figure 3D:
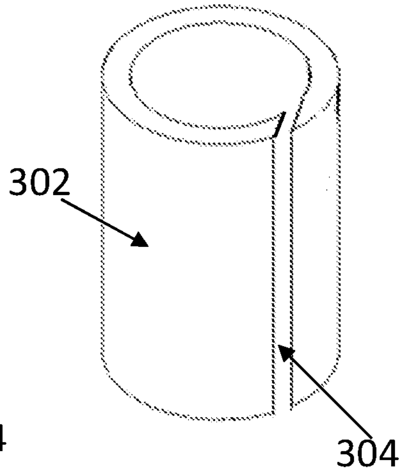
FIG. 3D shows a perspective view of a second alternative high voltage electrode and resiliently deformable mechanism of the plasma generator according to the second embodiment.

FIG. 3B shows a perspective view of the high voltage electrode 302 and the resiliently deformable mechanism 304 of the plasma generator 300. Referring to FIG. 3A and FIG. 3B, the high voltage electrode 302 is in the form of a hollow cylindrical structure and the resiliently deformable mechanism 304 includes a slot formed on the hollow cylindrical structure such that the hollow cylindrical structure is deformable to provide a biasing force to bias the external surface of the hollow cylindrical structure against the internal surface 303*a* of the dielectric barrier 303. The hollow cylindrical structure may be made of a metal plate. To further increase the area of the internal surface of the high voltage electrode 302 for accelerating the cooling of the high voltage electrode 302 and the dielectric barrier 303, the high voltage electrode 302 may include an uneven internal surface 303*a* to increase the contact surface with cooling air entering the hollow space of the high voltage electrode 302. For example, the internal surface 303*a* of the high voltage electrode 302 may include a plurality of semi-cylindrical recesses which are equally-spaced around a longitudinal axis of the cylindrical structure as shown in FIG. 3B. It should be noted that in other embodiments of the invention, the high voltage electrode 302 may have a smooth internal surface as shown in FIG. 3C, or the slot 304 on the hollow cylindrical structure may be formed and oriented along a direction parallel to a longitudinal axis of the cylindrical structure, as shown in FIG. 3D, in order to maximize the contact area between the high voltage electrode 302 and the dielectric barrier 303, thereby maximizing the efficiency of plasma generation.

Figure 3E:
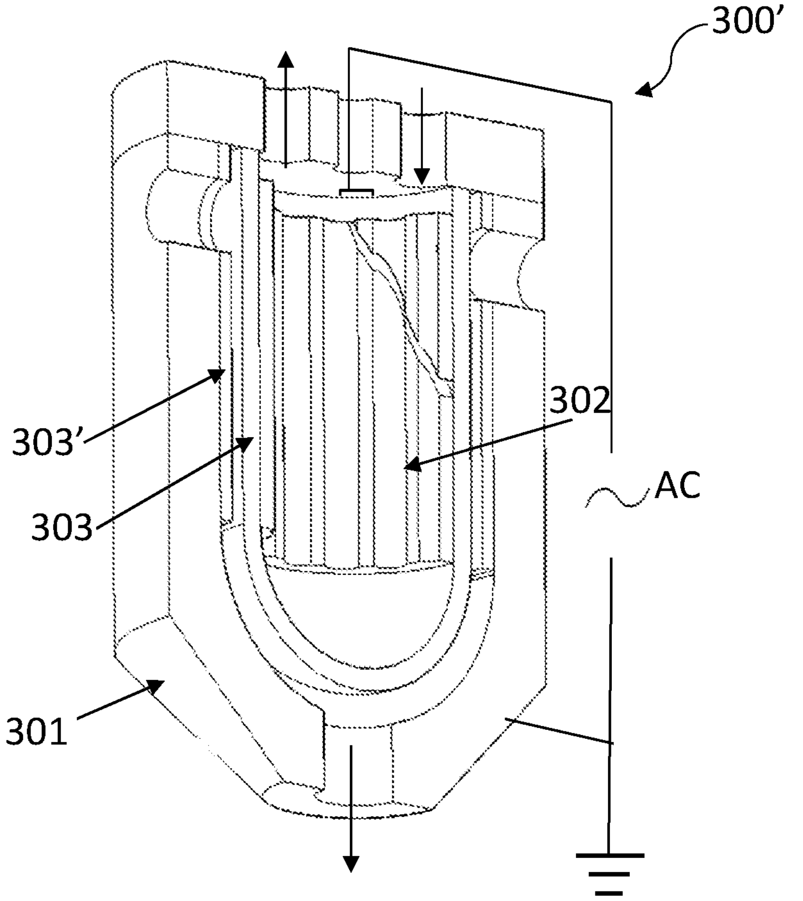
FIG. 3E shows a perspective cut-away view of a cylindrical-type dielectric barrier discharge plasma generator according to a third embodiment of the invention.

FIG. 3E shows a perspective cut-away view of a cylindrical-type dielectric barrier discharge plasma generator 300' according to a third embodiment of the invention. In the third embodiment, an additional dielectric barrier 303' is provided to cover an internal surface of the ground electrode 301. Specifically, the additional dielectric barrier 303' is arranged to cover at least the part of the internal surface of the ground electrode 301 facing a part of the dielectric barrier 303 which covers or contacts the high voltage electrode 302. Accordingly, in this embodiment, the discharge gap is formed between the dielectric barrier 303 covering the high voltage electrode 302 and the additional dielectric barrier 303' covering the ground electrode 301.

In various embodiments of the invention, the dielectric barrier attached to the high voltage electrode, or the additional dielectric barrier attached to the ground electrode may be made of alumina or quartz and may have a thickness of approximately 1 mm to 5 mm.

Figure 4A:
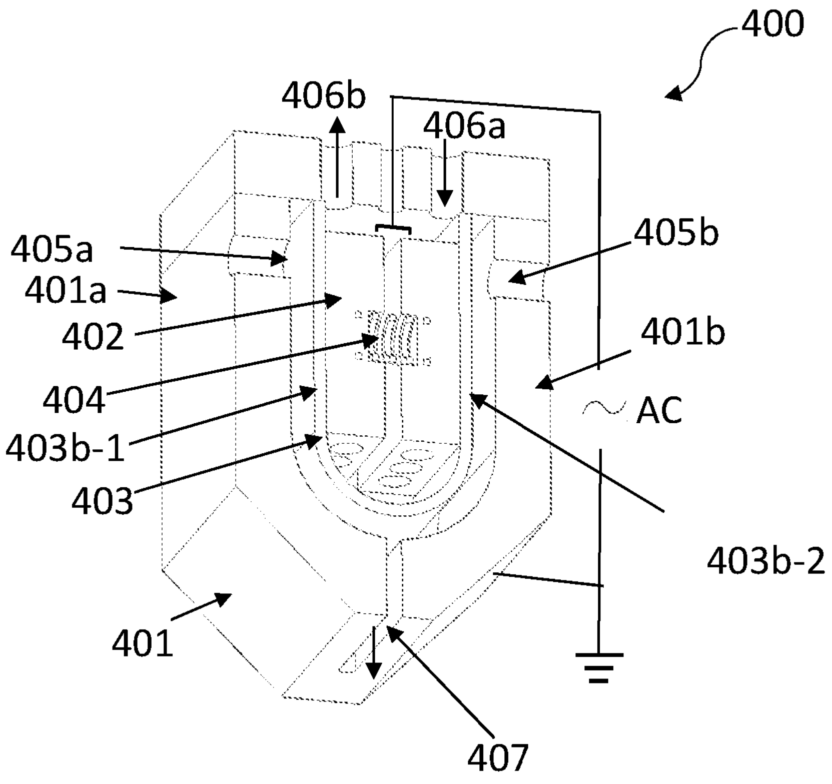
FIG. 4A and FIG. 4B respectively show perspective cut-away and cross-sectional views of a planar-type dielectric barrier discharge plasma generator according to a fourth embodiment of the invention.
Figure 4B:
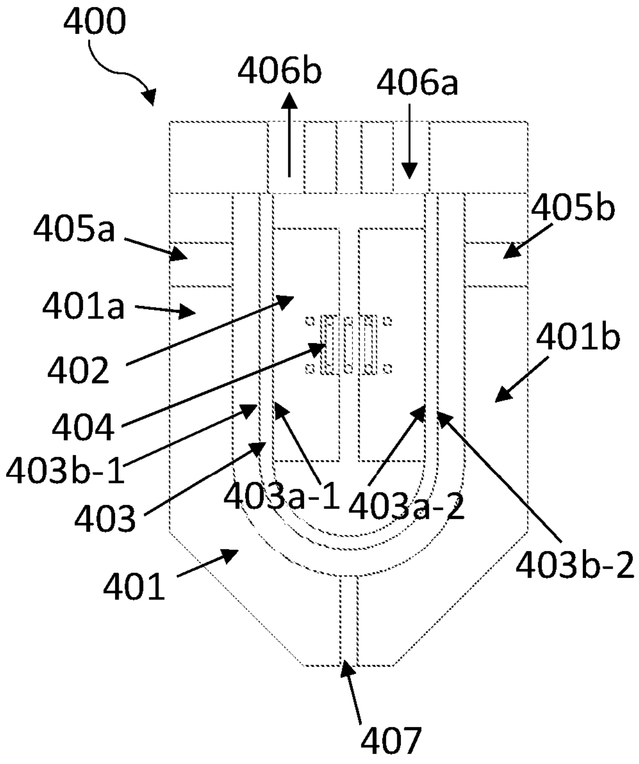

FIG. 4A and FIG. 4B respectively show perspective cut-away and cross-sectional views of a planar-type dielectric barrier discharge plasma generator 400 according to a fourth embodiment of the invention. Referring to FIG. 4A and FIG. 4B, the plasma generator 400 includes a ground electrode 401 in the form of a cuboid-shaped casing with a trapezoidal bottom, a dielectric barrier 403 located within the cuboid-shaped casing, the dielectric barrier 403 being in the form of a tubular structure with a rectangular cross-sectional shape, a high voltage electrode 402 having two separate cuboid-shaped conductive parts and being enclosed in a space formed by the dielectric barrier 403, and a resiliently deformable mechanism 404 in the form of a compression spring which is disposed between the two separate conductive parts of the high voltage electrode 402.

Figure 4C:
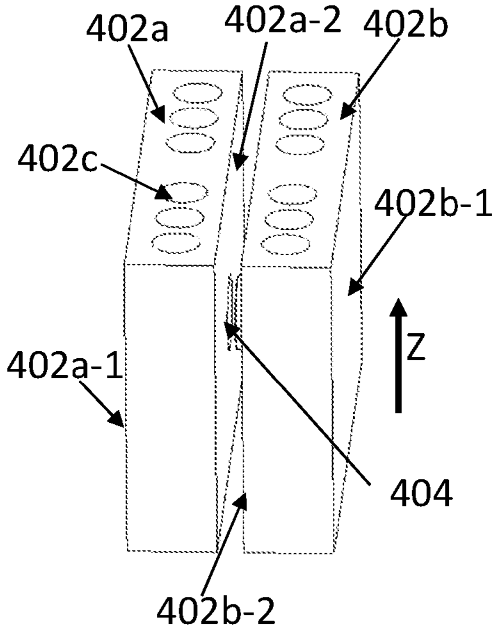
FIG. 4C shows a perspective view of a high voltage electrode and a resiliently deformable mechanism of the plasma generator according to the fourth embodiment.

FIG. 4C shows a perspective view of the high voltage electrode 402 and the resiliently deformable mechanism 404 (in the form of a compression spring) of the plasma generator 400 according to the fourth embodiment. As shown in FIG. 4C, the high voltage electrode 402 includes a first cuboid conductive part 402*a* with two opposing side faces 402*a*-1, 402*a*-2 and a second cuboid conductive part 402*b* with two opposing side faces 402*b*-1, 402*b*-2. The first and second conductive parts 402*a*, 402*b* are physically separated from each other, and the compression spring is located between the first conductive part 402*a* and the second conductive part 402*b*. Specifically, two ends of the compression spring are respectively coupled to the second side faces 402*a*-2, 402*b*-2 of the two conductive parts 402*a*, 402*b* such that when the high voltage electrode 402 and the compression spring are installed in the plasma generator 400, the compression spring is compressed to apply a biasing force to the first and second conductive parts 402*a*, 402*b* in order to bias the first and second conductive parts 402*a*, 402*b* against an internal surface 403*a* of the dielectric barrier 403. Specifically, when the high voltage electrode 402 and the compression spring are installed in the space formed by the dielectric barrier 403, the first side face 402*a*-1 of the first conductive part 402*a* is biased to fully contact a first internal face 403*a*-1 of the dielectric barrier 403, and the first side face 402*b*-1 of the second conductive part 402*b* is biased to fully contact a second internal face 403*a*-2 of the dielectric barrier 403, the first and second internal faces 403*a*-1, 403*a*-2 of the dielectric barrier 403 being opposite to each other.

Referring to FIG. 4A and FIG. 4B, the plasma generator 400 also includes a first reactive gas inlet 405*a* located in a first side wall 401*a* of the ground electrode 401, the first side wall 401*a* facing a first external face 403*b*-1 of the dielectric barrier 403, and a second reactive gas inlet 405*b* located in a second side wall 401*b* of the ground electrode 401, the second side wall 401*b* facing a second external face 403*b*-2 of the dielectric barrier 403. The dielectric barrier 403 is designed to enclose the high voltage electrode 402 to avoid the high voltage electrode from being in contact with the reactive gas for plasma generation. Alternatively, the first and second reactive gas inlets 405*a*, 405*b* may be located on the top wall of the ground electrode 401 as long as the reactive gas can be guided to enter the discharge gap between the ground electrode 401 and the dielectric barrier 403.

As shown in FIG. 4A and FIG. 4B, the plasma generator 400 further includes a cooling air inlet 406*a* and an air outlet 406*b* formed on a top cover of the plasma generator 400. Referring to FIG. 4C, each of the first and second conductive parts 402*a*, 402*b* may include a plurality of through-holes 402*c* passing through the conductive parts 402*a*, 402*b* along a vertical height direction Z of the high voltage electrode 402. The through-holes 402*c* are provided to allow cooling air to enter them so as to accelerate the cooling of the high voltage electrode 402. It should be noted that in some embodiments of the invention, the cooling air inlet 406*a* and/or the air outlet 406*b* may be further extended such that one end thereof contacts a top surface of the high voltage electrode 402 or enters into a through-hole of the high voltage electrode 402, so as to reduce the temperature of the high voltage electrode 402 faster.

The plasma generator 400 also includes a plasma outlet 407 as shown in FIG. 4A and FIG. 4B. The plasma outlet 407 has a rectangular slot opening located at the bottom end of the plasma generator 400. It should be noted that the shape of the opening is provided for illustrative purposes only, and is not intended to limit the scope of the invention. In other embodiments, the plasma generator 400 may have a plasma outlet with a different shape, e.g., a circular outlet or other outlet shapes such as those shown in FIG. 2D to FIG. 2F.

Figure 5A:
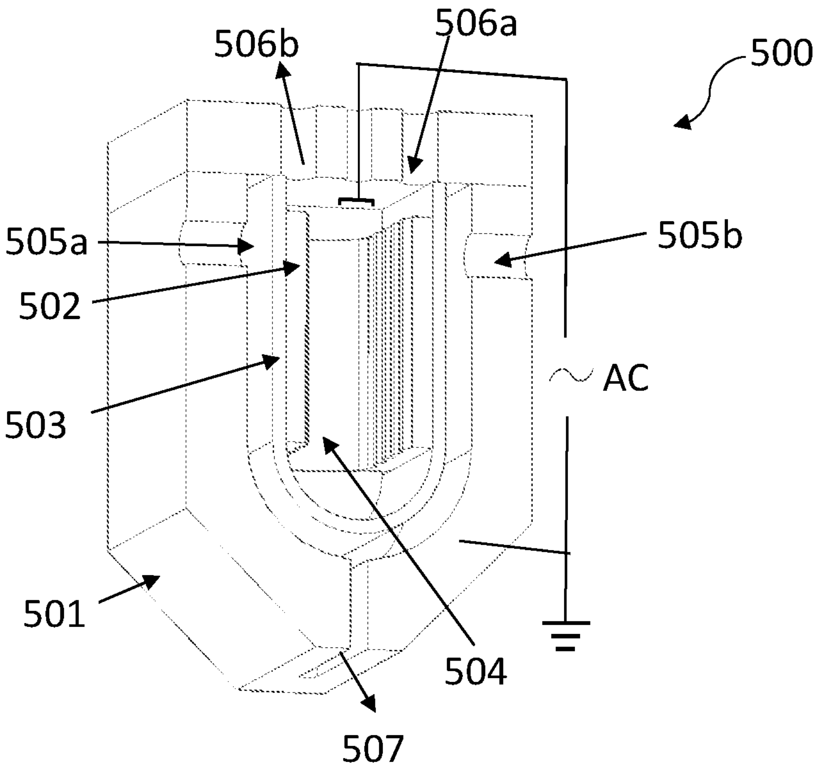
FIG. 5A shows a perspective cut-away view of a planar-type dielectric barrier discharge plasma generator according to a fifth embodiment of the invention.

FIG. 5A shows a perspective cut-away view of a planar-type dielectric barrier discharge plasma generator 500 according to a fifth embodiment of the invention. As shown in FIG. 5A, the structure and components of the plasma generator 500 are similar to the plasma generator 400 in the fourth embodiment, except that the high voltage electrode 502 and resiliently deformable mechanism 504 used in the fifth embodiment are different. Components that are similar to those of the plasma generator 400 of the fourth embodiment, e.g., the ground electrode 501, the dielectric barrier 503, the reactive gas inlets 505*a*, 505*b*, the cooling air inlet 506*a* and air outlet, 506*b*, and the plasma outlet 507 will not be described in further detail.

Figure 5B:
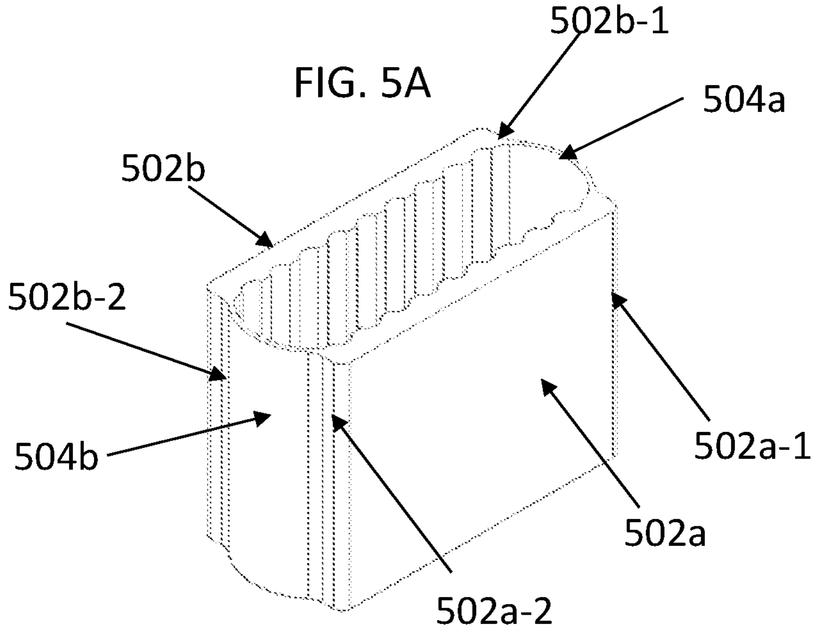
FIG. 5B shows a perspective view of a high voltage electrode and a resiliently deformable mechanism used in the fifth embodiment.

FIG. 5B shows a perspective view of the high voltage electrode 502 and resiliently deformable mechanism 504 used in the fifth embodiment. As shown in FIG. 5B, the high voltage electrode 502 includes a first conductive plate 502*a* and a second conductive plate 502*b* parallel to each other. Each conductive plate 502*a*, 502*b* has first and second opposing edges. The resiliently deformable mechanism 504 includes first and second curved metal plates 504*a*, 504*b*. The first edges 502*a*-1, 502*b*-1 of the two conductive plates 502*a*, 502*b* are connected by the first curved metal plate 504*a* and the second edges 502*a*-2, 502*b*-2 of the two conductive plates 502*a*, 502*b* are connected by the second curved metal plate 504*b*. In this embodiment, the curved metal plates 504*a*, 504*b* of the resiliently deformable mechanism 504 may be in the form of arc-shaped metal plates. To further increase the contact area of cooling air in the high voltage electrode 502, each conductive plate 502*a*, 502*b* may have an uneven internal surface. For example, a plurality of semi-cylindrical recesses may be formed on the internal surface of each conductive plate 502*a*, 502*b* as shown in FIG. 5B. It should be noted that in other embodiments of the invention, the first and second conductive plates 502*a*, 502*b* may not be parallel to each other as long as the two conductive plates 502*a*, 502*b* are designed and arranged to be biased to fully contact the dielectric barrier.

Figure 5C:
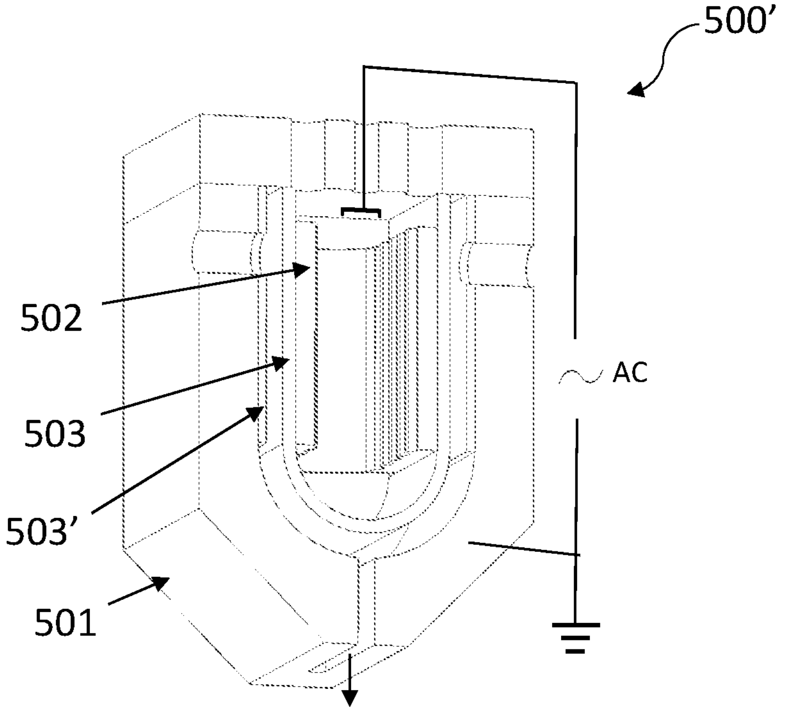
FIG. 5C shows a perspective cut-away view of a planar-type dielectric barrier discharge plasma generator according to a sixth embodiment of the invention.

FIG. 5C shows a perspective cut-away view of a planar-type dielectric barrier discharge plasma generator 500' according to a sixth embodiment of the invention. The only difference between the plasma generator 500' and the plasma generator 500 of the fifth embodiment is that the plasma generator 500' further includes an additional dielectric barrier 503' which covers at least a part of the internal surface of the ground electrode 501, the part of the internal surface facing the part of the dielectric barrier 503 which covers or contacts the high voltage electrode 502. Accordingly, a discharge gap for plasma generation is formed between the dielectric barrier 503 which covers the high voltage electrode 502 and the additional dielectric barrier 503' which covers the internal surface of the ground electrode 501.

It should be noted that the various embodiments described above are for illustrative purposes only and are not intended to be a limitation of this disclosure, as other configurations of the plasma generators are also possible. For example, the slot formed on the high voltage electrode may also be used as a resiliently deformable mechanism in a planar-type plasma generator, and the curved metal plates for connecting the first and second conductive parts of the high voltage electrode may also be used as a resiliently deformable mechanism in a cylindrical-type plasma generator.

As will be appreciated from the above description, the plasma generators provided in various embodiments of the invention are designed to discharge plasma along a cylindrical area or two sides of a planar dielectric barrier so as to improve the efficiency of plasma generation. Further, the proposed plasma generators include a resiliently deformable mechanism for offering a biasing force to bias the high voltage electrode of the plasma generator against the dielectric barrier so as to reduce or even eliminate an air gap between the high voltage electrode and the dielectric barrier attached thereto so as to avoid ineffective discharge, thereby improving the efficiency of plasma generation. The dielectric barrier is designed to enclose the high voltage electrode to prevent the high voltage electrode from contacting the reactive gas in the discharge gap for plasma generation. In addition, as the high voltage electrode is located in an enclosed space, even if any undesired discharge occurs due to an existing air gap between the high voltage electrode and the dielectric barrier, it will not affect the plasma treatment applied to the electronic component sample disposed below the plasma generator. The plasma generators further include a cooling air inlet and an air outlet to lower the temperature of the high voltage electrode faster.

Although the present invention has been described in considerable detail with reference to certain embodiments, other embodiments are possible. Therefore, the spirit and scope of the appended claims should not be limited to the description of the embodiments contained herein.

The invention claimed is:

1. A dielectric barrier discharge plasma generator, the plasma generator comprising:

a ground electrode that forms a casing, and a high voltage electrode enclosed within the casing, the ground electrode and the high voltage electrode being configured to form a circuit to receive a power input for plasma generation, a dielectric barrier having a first surface in contact with the high voltage electrode, and a second surface facing the ground electrode, a discharge gap being formed between the second surface of the dielectric barrier and the ground electrode for generating plasma, a resiliently deformable mechanism operative to bias the high voltage electrode against the first surface of the dielectric barrier, and a plasma outlet on the casing formed by the ground electrode, the plasma outlet being operative to discharge plasma onto an electronic component located outside the casing.

2. The plasma generator according to claim 1, wherein the high voltage electrode includes a first conductive part and a second conductive part which are physically separated from each other, wherein the resiliently deformable mechanism includes a resilient member disposed between the first conductive part and the second conductive part, the resilient member being operative to bias the first and second conductive parts against the first surface of the dielectric barrier.

3. The plasma generator according to claim 2, wherein the resilient member comprises a compression spring.

4. The plasma generator according to claim 2, wherein the first and second conductive parts include two semi-cylindrical structures or two cuboid-shaped structures.

5. The plasma generator according to claim 2, wherein the resilient member comprises at least one deformable sheet metal plate.

6. The plasma generator according to claim 5, wherein the resilient member comprises two curved deformable sheet metal plates, each having a first edge and a second edge on opposing sides of the sheet metal plate, the first and second edges of each sheet metal plate being coupled to two opposite ends of the first and second conductive parts respectively.

7. The plasma generator according to claim 6, wherein the first and second conductive parts include two planar or curved metal plates.

8. The plasma generator according to claim 1, wherein the resiliently deformable mechanism includes a slot formed on the high voltage electrode such that the high voltage electrode is deformable to provide a biasing force to bias an external surface of the high voltage electrode against the first surface of the dielectric barrier.

9. The plasma generator according to claim 8, wherein the slot is formed and oriented along a direction parallel to a longitudinal axis of the high voltage electrode.

10. The plasma generator according to claim 9, wherein the high voltage electrode includes a cylindrically shaped metal plate.

11. The plasma generator according to claim 1, wherein the dielectric barrier comprises a tubular structure which encloses the high voltage electrode.

12. The plasma generator according to claim 1, wherein the first surface of the dielectric barrier includes a cylindrical inner surface of the dielectric barrier, and the second surface of the dielectric barrier includes a cylindrical outer surface of the dielectric barrier.

13. The plasma generator according to claim 1, wherein the dielectric barrier has a rectangular cross-section, the first surface of the dielectric barrier including two opposing side faces of the dielectric barrier.

14. The plasma generator according to claim 1, further comprising a cooling air inlet formed on a top cover of the plasma generator to allow cooling air to enter a space enclosed by the dielectric barrier in which the high voltage electrode is located, and an air outlet formed on the top cover to discharge air from the space.

* * * * *